Feb. 1, 1938.   M. TIBBETTS   2,106,860
BEARING
Filed Feb. 20, 1935
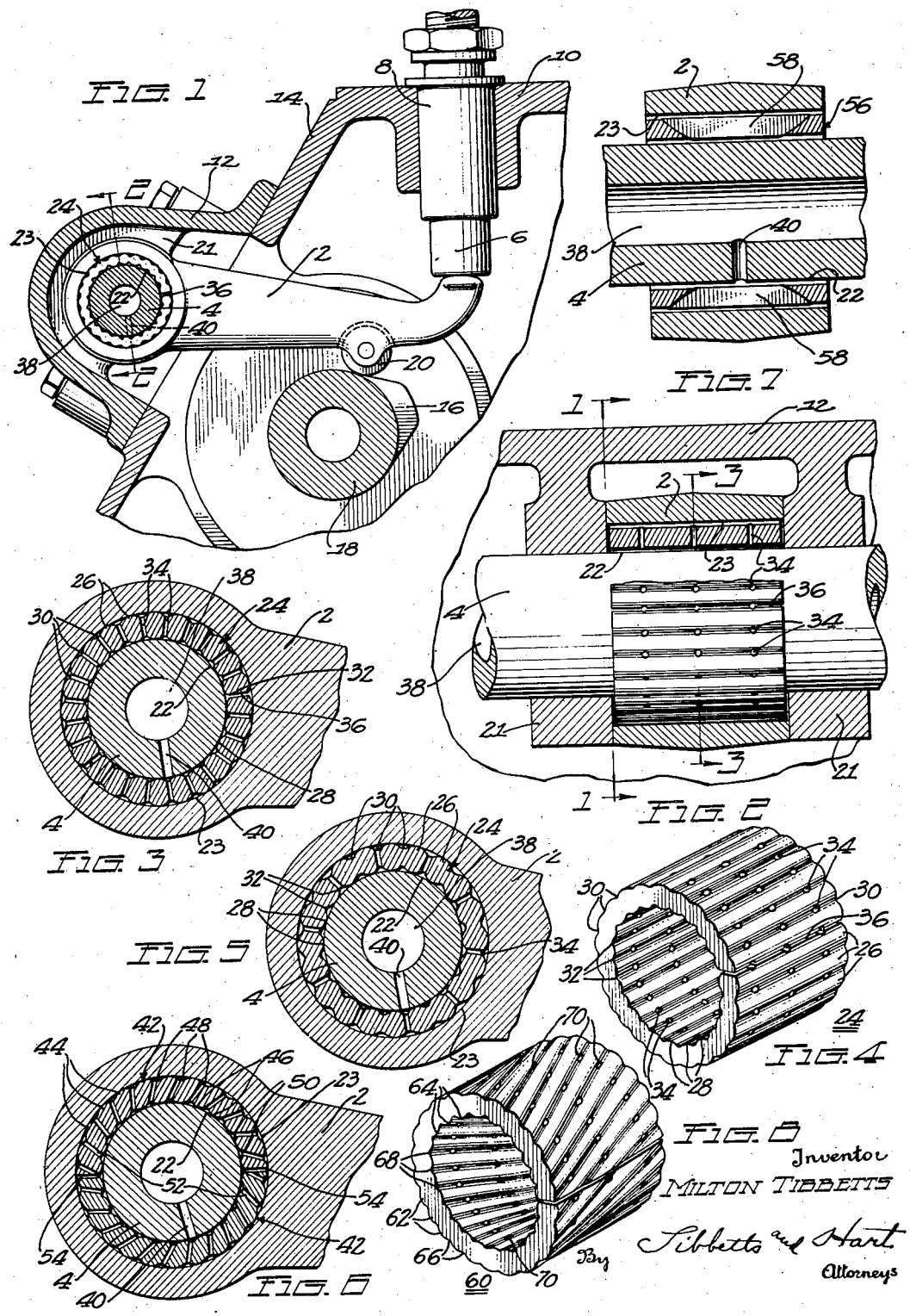
Inventor
MILTON TIBBETTS Patented Feb. 1, 1938

2,106,860

UNITED STATES PATENT OFFICE 2,106,860

BEARING

Milton Tibbetts, Detroit, Mich., assignor to Packard Motor Car Company, Detroit, Mich., a corporation of Michigan Application February 20, 1935, Serial No. 7,311

14 Claims. (Cl. 308—240)

This invention relates to bearings for parts having relative rotary movements, the term "rotary" applying to continuous rotational movements and to oscillatory movements of said parts about a common axis. The invention is intended particularly as an improvement in bearings for certain parts embodied in motor vehicles. The invention is not limited, however, to bearings for such parts but certain features thereof may be employed with advantage in bearings for the parts of other mechanisms.

One object of the present invention is to produce a novel and improved bearing for parts having relative rotary movements which is simple in construction and inexpensive to manufacture and which will enable the parts to move relatively with very little friction.

Another object of the invention is to produce an improved bearing construction for parts having relative rotary movements in which the total area of contact of the surfaces having relative movements is small and the lubricant is distributed effectively to the relatively moving parts.

Another object of the invention is to produce an improved bearing construction comprising a relatively small number of parts which may be cheaply manufactured and readily assembled and which may be employed in place of the usual roller bearings.

With the above and other objects in view the invention consists in a construction embodying the novel and improved features hereinafter described and particularly pointed out in the claims, the advantages of which will be readily understood and appreciated by those skilled in the art.

The invention will be clearly understood from the accompanying drawing illustrating constructions embodying the invention in several forms and the following detailed description of the constructions therein shown.

In the drawing Fig. 1 is a view in vertical section illustrating certain parts of the valve operating mechanism of an internal combustion engine of which the valve rocker-arm is provided with a bearing embodying the invention.

Fig. 2 is a view principally in section taken substantially on the line 2—2 of Fig. 1 and illustrating certain parts of the bearing in elevation.

Fig. 3 is a view in vertical section taken substantially on the line 3—3 of Fig. 2.

Fig. 4 is a detail perspective view illustrating a bearing bushing forming one of the elements of the bearing shown in Figs. 1 to 3 inclusive.

Fig. 5 is a view similar to Fig. 3 illustrating a bearing embodying a bearing sleeve having a somewhat different construction.

Fig. 6 is a view similar to Figs. 3 and 5 illustrating a bearing embodying a bearing sleeve having a still different construction.

Fig. 7 is a detail sectional view taken in a plane containing the axis of the rocker-arm and illustrating a bearing embodying a bearing sleeve having a still different construction and Fig. 8 is a detail perspective view illustrating a bearing sleeve of still different construction.

As above stated, the invention is shown as embodied in a bearing for the rocker-arm of a valve actuating mechanism for an internal combustion engine. It is to be understood, however, that the invention is not limited to use in connection with any particular mechanism or type of mechanism but that it may be embodied with advantage in bearings for various operating parts of motor vehicles and other mechanisms.

The valve operating mechanism shown in the drawing comprises a rocker-arm indicated at 2 mounted to oscillate about a fixed shaft 4 and engaging a valve tappet 6 arranged to slide in a suitable guide 8 secured within an engine block 10.

The shaft 4 is supported in brackets 12 secured to the inclined plate 14 forming part of the engine block. The rocker arm 2 is oscillated about the shaft 4 by means of a cam 16 secured to a rotary cam shaft 18 and arranged to engage a roller 20 carried by the rocker arm. As shown in Fig. 2 each of the brackets 12 is provided with spaced supporting arms 21 having respectively openings in which the shaft 4 is engaged, the rocker arm being located between the arms 21. The portion of the shaft 4 between the arms 21 is formed with an outer cylindrical bearing surface 22 and the hub portion of the rocker arm is formed with an inner cylindrical bearing surface 23 spaced from the bearing surface of the shaft. The shaft and the hub of the rocker arm constitute inner and outer members arranged for relative rotary movement about the axis of the shaft.

The bearing for the rocker-arm comprises floating bearing means interposed between the cylindrical bearing surfaces 22 and 23. In the construction shown in Figs. 1 to 4 inclusive the floating bearing means consists of a bearing sleeve 24 having outer bearing ridges or ribs 26 arranged to engage the bearing surface 23 of the rocker arm 2 and inner bearing ridges or ribs 28 arranged to engage the bearing surface 22 of the shaft 2. As shown in these figures of the drawing these bearing ridges are parallel with each other and extend substantially parallel with the common axis of the shaft 4 and the hub of the rocker arm and each ridge has substantially a line contact with either the bearing surface 22 or the bearing surface 23. Each ridge is formed with a bearing surface convexly curved in cross section and preferably consists of the surface of a cylinder.

In the construction shown in Figs. 1 to 4 inclusive the bearing sleeve is made up of a series of integrally connected parallel cylinders, the cylinders thus being connected in a series or chain. The outer bearing ridges of the sleeve thus are relatively fixed as are also the inner bearing ridges of the sleeve and the inner and outer ridges are also fixed and unyielding with relation to each other. Thus the sleeve forms an unyielding bearing for the arm upon which the arm is arranged to oscillate freely. The recesses between the ridges 26 and the corresponding recesses between the ridges 28 indicated respectively at 30 and 32 form pockets in which the lubricant is held and from which it is distributed as required to the contact portions of the bearing surfaces of the ridges and to the bearing surfaces 22 and 23. In order to provide for the flow of lubricant from the inner recesses 32 to the outer recesses 30, the sleeve 24 is provided with oil ducts 34 extending between the inner and outer recesses. Any desired number of these ducts may be formed in the sleeve and the ducts may have any desired arrangement to produce the required distribution of oil from the inner to the outer recesses.

Fig. 1 shows the actual size of the parts of a bearing which it is proposed to embody in a valve actuating mechanism. In the other figures of the drawing the parts are shown enlarged to double the size shown in Fig. 1. Each of the cylinders of which the sleeve 24 is made up has a small diameter as compared with the length thereof as clearly shown. The length of the sleeve preferably is such that it fits closely between the supporting arms 22 on the bracket 12 between which the rocker arm 2 is mounted to oscillate.

As shown in Figs. 1 to 4 inclusive, the sleeve 24 is split as indicated at 36. This split construction of the sleeve enables the same to be expanded or contracted slightly in fitting the same between the shaft 4 and the hub of the rocker arm and obviates the making of the sleeve with as high a degree of accuracy and precision as would be required if the sleeve were made continuous. The sleeve, however, may, if desired, be made as a continuous sleeve as shown in Fig. 5.

The shaft 4 is provided with a longitudinal bore 38 and with radial ducts 40 through which oil is pumped during the operation of the internal combustion engine. During the rapid oscillation of the rocker arm, the sleeve floats between the hub of the arm and the shaft 4 and may rotate freely about the axis of the shaft 4 with relation to the shaft or with relation to the hub of the arm. The line contacts between the sleeve and the hub of the arm and between the sleeve and said shaft enable the rocker arm to oscillate about the shaft with very little friction. The movement of the sleeve about the shaft 4 distributes the lubricant to the inner recesses 32 and from these recesses the lubricant passes through the ducts 34 to the outer recesses 30. This constitutes a very efficient construction for lubricating the bearing.

The construction shown in Fig. 5 differs from that shown in Figs. 1 to 4 inclusive in that in the former construction the axes of the cylinders of which the sleeve is made up are arranged slightly farther apart than in the latter construction and the oil ducts connected with successive recesses in the former construction have a staggered arrangement. The sleeve shown in Fig. 5 is also formed as a continuous sleeve as stated above. In Fig. 5, the parts corresponding to those shown in Fig. 3 are indicated by the same reference numerals.

In the construction shown in Fig. 6 the bearing sleeve indicated at 42 is provided with a series of outer bearing ridges 44 arranged to engage the bearing surface 23 of the arm 2 and with a series of inner bearing ridges 46 arranged to engage the bearing surface 22 of the shaft 4. The bearing ridges 44 and 46, as in the construction shown in Figs. 1 to 5 inclusive, are substantially parallel with the axis of the sleeve 42. These ridges are formed with bearing surfaces curved and preferably substantially cylindrical in cross section and each have substantially a line contact either with the bearing surface 23 or with the bearing surface 22. The construction shown in Fig. 6 differs from that shown in Figs. 1 to 5 inclusive in that the bearing ridges 44 in the former construction are not located opposite the bearing ridges 46 in directions radially of the sleeve but the said ridges 44 and 46 are arranged in staggered relation. The bearing sleeve 42 is formed with outer recesses 48 between the ridges 44 and with inner recesses 50 between the ridges 46 and is provided with oil ducts 52 connecting the inner and outer recesses as shown clearly in Fig. 6. Because of the relative positions of the recesses 48 and 50 the ducts 52 are inclined to the radii of the sleeve 42.

The sleeve 42 is split at two points as indicated at 54 thereby dividing the sleeve into two parts or sections. The sleeve may be divided at other points if desired.

Fig. 7 of the drawing shows a bearing sleeve indicated at 56 having a construction for distributing oil somewhat different from the constructions shown in Figs. 1 to 6 inclusive. In the construction shown in Fig. 7 the sleeve is formed with slots 58 between the inner and outer bearing ridges for connecting the inner recesses with the outer recesses. These slots may be conveniently formed by making saw cuts in the sleeve. These slots will provide for a somewhat freer flow of oil between the inner and outer recesses than is permitted by the ducts shown in the other constructions.

The bearing ridges may extend substantially parallel with the axis of the sleeve as shown in Figs. 1 to 7 inclusive of the drawing or they may extend in an angular relation to said axis. The bearing ridges, instead of being parallel with each other as shown, may extend in angular relations to each other. The outer bearing ridges may also extend in an angular relation to the inner bearing ridges. Fig. 8 shows a bearing sleeve 60 formed with parallel bearing ridges 62 extending spirally about the outside of the sleeve in one direction and with parallel bearing ridges 64 extending spirally about the inside of the sleeve in the same direction. The sleeve is formed with outer recesses 66 between the ridges 62 and with inner recesses 68 between the ridges 64 and with ducts 70 connecting the inner and outer recesses. This construction is particularly effective in distributing oil to the parts of the bearing since the rotation of the sleeve tends to cause a flow of oil longitudinally of each recess.

The present bearing construction may be employed with advantage in a bearing in which the inner or outer bearing member or both inner and outer members are provided with conical bearing surfaces between which the bearing sleeve is placed. The present construction also may be embodied in a spherical bearing such as used in universal joints in which case the inner and outer members will be provided respectively with spherical surfaces and the bearing sleeve will have a spherical form.

It is to be understood that the invention is not limited to the particular construction of the illustrated embodiment of the invention but that the said construction is merely illustrative of the invention and that the invention may be embodied in other forms within the scope of the claims.

Having explained the nature and object of the invention and having specifically described a construction embodying the invention in its preferred form what is claimed is:

1. A bearing construction comprising members arranged for relative rotation and having spaced bearing surfaces and floating bearing means interposed between said members and provided with a series of relatively fixed separated contact portions each having substantially a line contact with the bearing surface of one of said members and a series of relatively fixed separated contact portions each having substantially a line contact with the bearing surface of the other of said members.

2. A bearing construction comprising members arranged for relative rotative movements and spaced from each other and floating bearing means interposed between said members and provided with a series of relatively fixed unyielding bearing ridges each having substantially a line contact with one of said members and with a series of relatively fixed unyielding bearing ridges each having substantially a line contact with the other of said members.

3. A bearing construction comprising inner and outer members constructed and arranged for relative rotation and bearing means interposed between said members and movable with relation to both said members about the common axis thereof and having a series of fixedly connected outer ridges formed with substantially cylindrical bearing surfaces for engagement with said outer member and a series of fixedly connected inner ridges formed with substantially cylindrical bearing surfaces for engagement with said inner member and lubricant holding recesses between said ridges.

4. A bearing construction comprising inner and outer members arranged for relative rotation and spaced from each other and a floating bearing interposed between said members and comprising a chain of non-rotatable cylinders each having surfaces respectively engaging said inner and outer members.

5. A bearing construction comprising members arranged for relative rotation and spaced from each other and floating bearing means interposed between said members and provided with a chain of unyielding ridges each having substantially a line engagement with one of said members and a chain of unyielding ridges each having substantially a line engagement with the other of said members and lubricant holding recesses between said ridges.

6. A bearing construction comprising inner and outer members arranged for relative rotative movements and having spaced bearing surfaces and floating bearing means interposed between said members and provided with a series of relatively fixed rigid bearing ribs each having substantially a line contact with said outer member and extending in angular directions with relation to the axis of rotation of said members and a series of relatively fixed rigid inner bearing ribs each having substantially a line contact with said inner member and extending in angular directions with relation to the axis of rotation of said members.

7. A bearing construction comprising relatively rotative members having spaced bearing surfaces and bearing means mounted for floating movements between said members and provided with a series of relatively fixed unyielding bearing ridges each having substantially a line contact with one of said members and a series of lubricant holding recesses located respectively between said ridges and a series of relatively fixed unyielding bearing ridges each having substantially a line contact with the other of said members and with a second series of lubricant holding recesses located respectively between the latter ridges and ducts for the flow of lubricant connecting the recesses of the first and second series.

8. A bearing construction comprising a shaft having a central bore, an outer bearing surface and a duct leading from said bore to said surface, a member mounted to rotate relatively to the shaft about the axis thereof and having a bearing surface spaced from the bearing surface of the shaft, a bushing interposed between the bearing surfaces of the shaft and said member respectively and provided with a series of relatively fixed unyielding outer bearing ridges each having substantially a line contact with the bearing surface of the second member and a series of lubricant holding recesses located respectively between said ridges and with a series of relatively fixed unyielding inner bearing ridges each having substantially a line contact with the bearing surface of the shaft and a second series of lubricant holding recesses located respectively between the latter ridges and ducts connecting respectively the inner and outer recesses and means for feeding oil through the bore in said shaft.

9. A bearing construction comprising members arranged for relative rotation and having spaced bearing surfaces and floating bearing means interposed between said members and provided with a series of relatively fixed separated contact portions each having substantially a line contact with the bearing surface of one of said members and a series of relatively fixed separated contact portions each having substantially a line contact with the bearing surface of the other of said members, there being the same number of line contacts in one series as in the other.

10. A bearing construction comprising inner and outer members constructed and arranged for relative rotation and bearing means interposed between said members and movable with relation to both said members about the common axis thereof and having a series of fixedly connected outer ridges formed with substantially cylindrical bearing surfaces for engagement with said outer member and a series of fixedly connected inner ridges formed with substantially cylindrical bearing surfaces for engagement with said inner member and lubricant holding recesses between said ridges, the cylindrical bearing surfaces of the inner ridges being the same in number and having the same radii as the cylindrical bearing surfaces of the outer ridges.

11. A bearing construction comprising inner and outer members arranged for relative rotation and spaced from each other, and a floating bearing member interposed between said members and having only substantially line contacts with each of said members and having the same number of line contacts with each of said members.

12. A bearing construction comprising inner and outer relatively rotatable members spaced from each other and a floating bearing sleeve between said members, said members and said sleeve being so formed that there is the same amount of bearing surface between the sleeve and one member as between the sleeve and the other member.

13. A bearing construction comprising inner and outer relatively rotatable members spaced from each other and a floating bearing sleeve between said members, said members and said sleeve being so formed that there are only substantially line contacts between the sleeve and each of said members and those contacts are of the same extent between the sleeve and each of said members.

14. A bearing construction comprising inner and outer members arranged for relative rotation and spaced from each other, and a floating bearing member interposed between said members and having only substantially line contacts with each of said members, a plurality of the portions having said line contacts being connected with each other, and the line contacts of said portions being equal and radially opposite on the inside and outside of said bearing member.

MILTON TIBBETTS.